United States Patent
Kim

(10) Patent No.: US 11,052,939 B2
(45) Date of Patent: Jul. 6, 2021

(54) STEERING FEEL CONTROL APPARATUS AND METHOD OF MOTOR DRIVEN POWER STEERING

(71) Applicant: Hyundai Mobis Co., Ltd., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 318 days.

(21) Appl. No.: 16/172,020

(22) Filed: Oct. 26, 2018

(65) Prior Publication Data
US 2019/0126974 A1    May 2, 2019

(30) Foreign Application Priority Data
Oct. 27, 2017  (KR) .................. 10-2017-0141460

(51) Int. Cl.
*B62D 5/04*  (2006.01)
(52) U.S. Cl.
CPC .................. *B62D 5/0472* (2013.01)
(58) Field of Classification Search
CPC .................................................. B62D 5/0472
See application file for complete search history.

(56) References Cited

U.S. PATENT DOCUMENTS

| | | | |
|---|---|---|---|
| 10,526,009 B2 | 1/2020 | Tsubaki | |
| 10,589,779 B2* | 3/2020 | Sugawara | B62D 5/0463 |
| 2005/0065685 A1* | 3/2005 | Hamamoto | B62D 5/0466 |
| | | | 701/41 |
| 2010/0268421 A1 | 10/2010 | Yang et al. | |
| 2019/0337556 A1* | 11/2019 | Tsubaki | B62D 15/025 |
| 2019/0359203 A1* | 11/2019 | Isshiki | B60W 30/025 |

FOREIGN PATENT DOCUMENTS

| | | |
|---|---|---|
| CN | 109803874 | 5/2019 |
| JP | 2006188183 A * | 7/2006 |
| KR | 10-2010-0114995 | 3/2011 |

* cited by examiner

*Primary Examiner* — Jess Whittington
*Assistant Examiner* — Brian E Yang
(74) *Attorney, Agent, or Firm* — H.C. Park & Associates, PLC

(57) ABSTRACT

A steering feel control apparatus of a motor driven power steering (MDPS) system may include: a filter configured to filter a motor current inputted to a motor, in order to remove a vibration component which generates vibration on a steering wheel; and a controller configured to control the filter to remove the vibration component of the motor current when the MDPS is driven.

11 Claims, 7 Drawing Sheets

STEERING FEEL CONTROL APPARATUS AND METHOD OF MOTOR DRIVEN POWER STEERING

CROSS-REFERENCES TO RELATED APPLICATIONS

This application claims priority from and the benefit of Korean Patent Application No. 10-2017-0141460, filed on Oct. 27, 2017, which is hereby incorporated by reference for all purposes as if set forth herein.

BACKGROUND

Field

Exemplary embodiments relate to a steering feel control apparatus and method of a motor driven power steering (MDPS) system, and more particularly, to a steering feel control apparatus and method of an MDPS, which can reduce vibration of the MDPS by decreasing noise of a motor current.

Discussion of the Background

The MDPS system has a smaller weight and occupies a smaller space than the existing hydraulic power steering system, and does not require an oil change unlike the hydraulic power steering system. The MDPS system provides a part of steering torque which a driver needs to apply to a steering wheel during a steering operation, using an auxiliary power supply, thereby enabling the driver to easily perform the steering operation.

That is, a steering intention of the driver is sensed through a torque sensor connected to the steering wheel, and the MDPS system receives the sensed signal from the torque sensor and drives a motor to provide a proper force in consideration of the current velocity of the vehicle, thereby assisting a steering force.

When the vehicle is stopped or parked or while the vehicle is driven at low velocity, the MDPS system assists a large force to lessen the driver's force. While the vehicle is driven at high velocity, the MDPS system assists only a small force to maintain the stability of the vehicle body.

The related art of the present invention is disclosed in Korean Publication Patent No. 2010-0114995 published on Oct. 27, 2010 and entitled "Steering return method of MDPS".

In the conventional MDPS system, however, a steering wheel shimmy may be caused by a wheel imbalance or an eccentricity or deformation of a disk wheel while the vehicle drives, or natural vibration may occur due to a separation or distortion of a mechanical part.

The above information disclosed in this Background section is only for enhancement of understanding of the background of the invention and, therefore, it may contain information that does not constitute prior art.

SUMMARY

Exemplary embodiments of the present invention are directed to a steering feel control apparatus and method of an MDPS system, which can detect vibration or noise fro a steering angular velocity or motor current, and reduce the detected vibration or noise through a variable band stop filter, thereby decreasing vibration of the MDPS system.

In one embodiment, a steering feel control apparatus of an MDPS system may include: a filter configured to filter a motor current inputted to a motor, in order to remove a vibration component which generates vibration on a steering wheel; and a controller configured to control the filter to remove the vibration component of the motor current when the MDPS system is driven.

The filter may include: a variable band stop filter configured to filter the motor current; and a bandwidth adjuster configured to adjust a bandwidth of the variable bandwidth stop filter according to a steering angular velocity of the steering wheel.

The bandwidth adjuster may reduce the bandwidth by increasing a bandwidth factor of the variable band stop filter as the steering angular velocity of the steering wheel is increased.

The filter may include: a variable band stop filter configured to filter the motor current; and a depth adjuster configured to adjust a depth of the variable band stop filter according to a steering angular velocity of the steering wheel.

The depth adjuster may decrease a depth gain of the variable band stop filter as the steering angular velocity of the steering wheel is increased.

The filter may include: a variable band stop filter configured to filter the motor current; and a mode setter configured to set a frequency factor of the bandwidth stop filter according to an operation mode.

The filter may set a frequency factor of the variable band stop filter to a preset value or a steering angular velocity of the steering wheel.

In another embodiment, a steering feel control method of an MDPS system may include: generating, by a motor current generator, a motor current; and filtering, by a filter, the motor current through a variable band stop filter, such that the vibration component to generate vibration on a steering wheel is removed from the motor current generated by the motor current generator.

The filtering of the motor current may include: removing order-related noise based on natural vibration frequency noise or steering velocity by setting a frequency factor of the variable band stop filter according to an operation mode; and tuning the variable band stop filter according to the steering angular velocity of the steering wheel.

The removing of the order-related noise may include setting a frequency factor of the variable band stop filter to a preset value or a steering angular velocity of the steering wheel.

The tuning of the variable band stop filter may include adjusting a bandwidth of the variable band stop filter according to a steering angular velocity of the steering wheel.

The tuning of the variable band stop filter may include reducing the bandwidth by increasing a bandwidth factor of the variable band stop filter as the steering angular velocity of the steering wheel is increased.

The tuning of the variable band stop filter may include adjusting a depth of the variable band stop filter according to a steering angular velocity of the steering wheel.

The tuning of the variable band stop filter may include decreasing a depth gain of the variable band stop filter as the steering angular velocity of the steering wheel is increased.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incor

DETAILED DESCRIPTION OF THE ILLUSTRATED EMBODIMENTS

Figure 1:
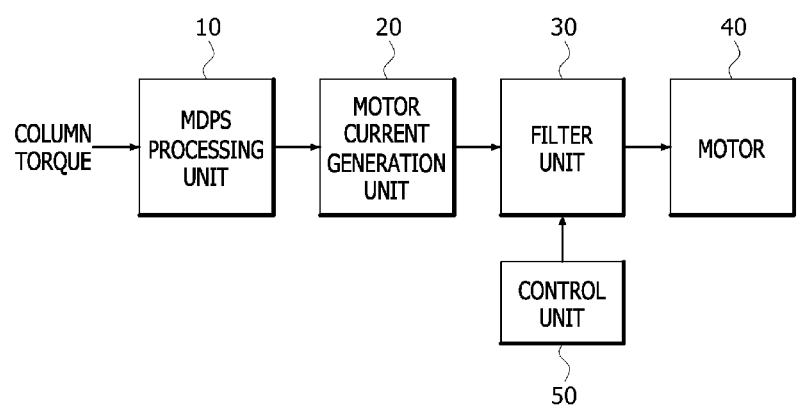
- FIG. 1 is a block diagram illustrating a steering feel control apparatus of an MDPS system in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 2:
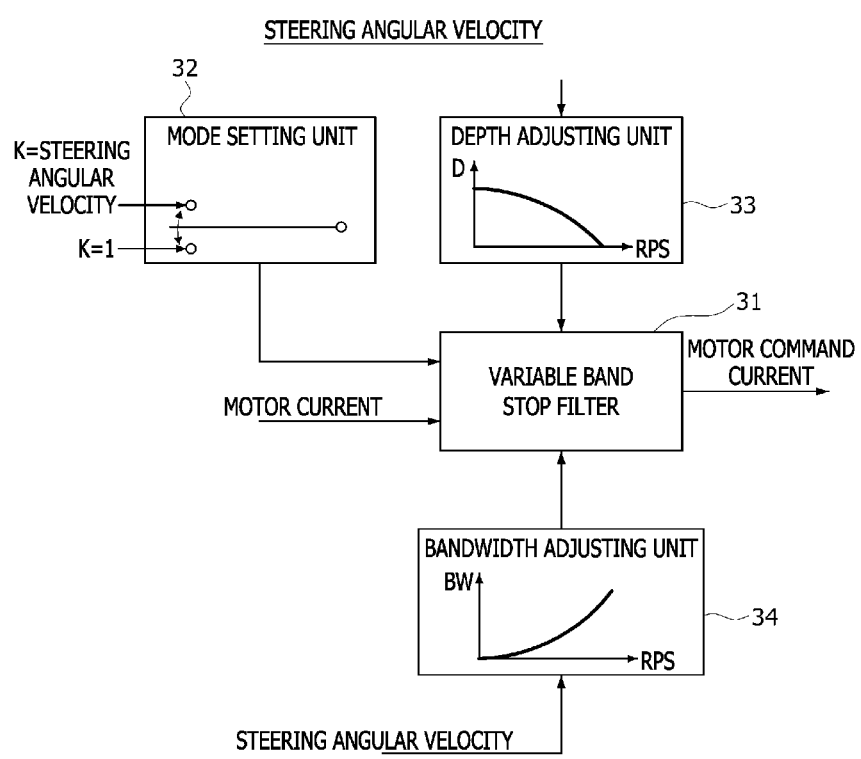
FIG. 2 is a block diagram illustrating a filter in accordance with the embodiment of the present invention.
Figure 3:
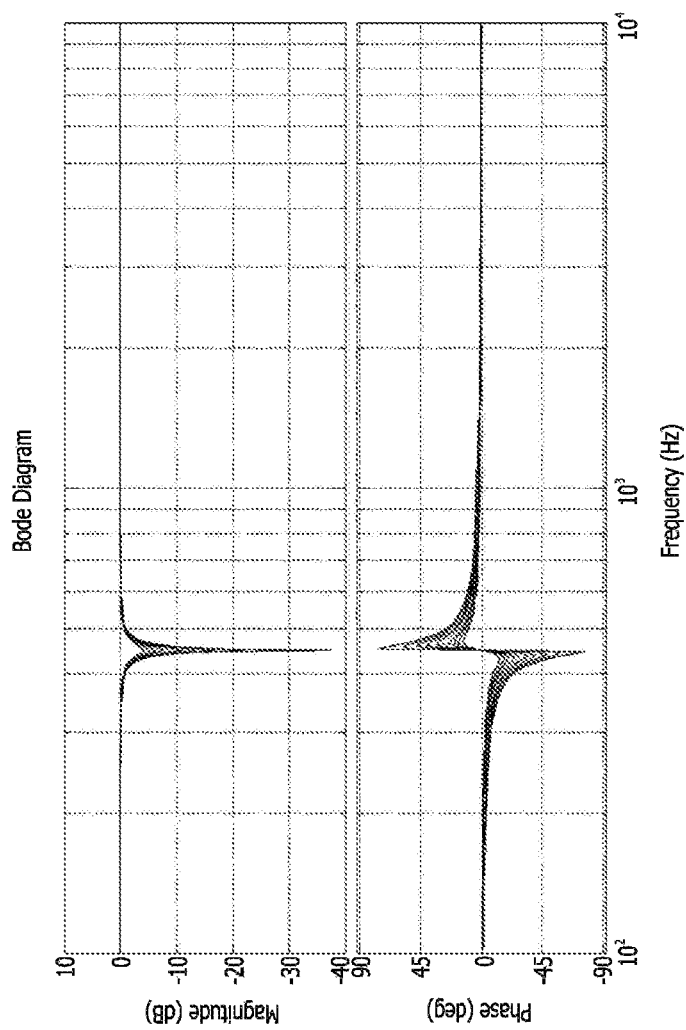
FIG. 3 is a graph illustrating a filter depth change by depth gain adjustment in accordance with the embodiment of the present invention.
Figure 4:
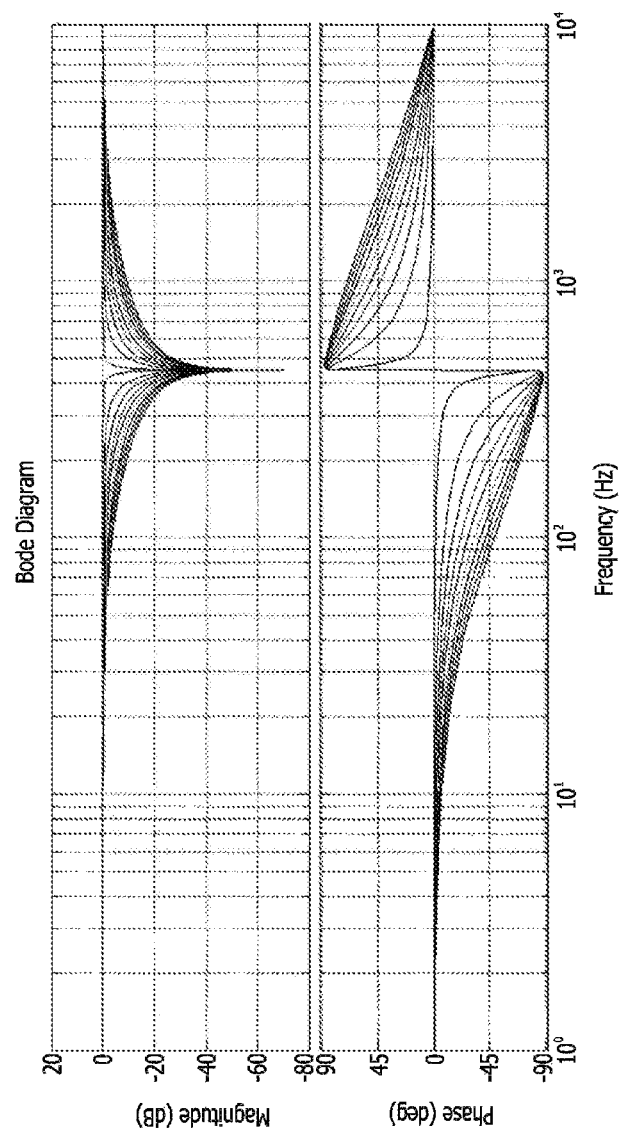
FIG. 4 is a graph illustrating a bandwidth change by bandwidth factor adjustment in accordance with the embodiment of the present invention.
Figure 5:
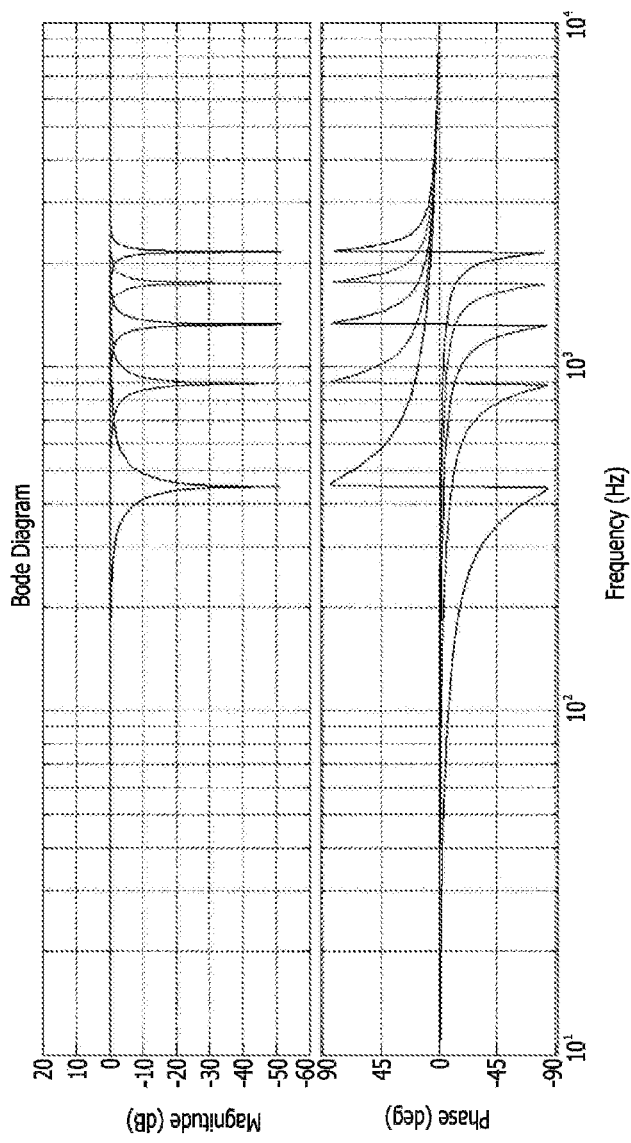
FIG. 5 is a graph illustrating a center frequency change by frequency factor adjustment in accordance with the embodiment of the present invention.

FIG. 1 is a block diagram illustrating a steering feel control apparatus of an MDPS system in accordance with an embodiment of the present invention, FIG. 2 is a block diagram illustrating a filter in accordance with the embodiment of the present invention, FIG. 3 is a graph illustrating a filter depth change by depth gain adjustment in accordance with the embodiment of the present invention, FIG. 4 is a graph illustrating a bandwidth change by bandwidth factor adjustment in accordance with the embodiment of the present invention, and FIG. 5 is a graph illustrating a center frequency change by frequency factor adjustment in accordance with the embodiment of the present invention.

Referring to FIG. 1, the steering feel control apparatus of an MDPS system in accordance with the embodiment of the present invention may include an MDPS processing unit 10, a motor current generator 20, a filter 30, a motor 40 and a controller 50.

The MDPS processing unit 10 may receive column torque from a torque sensor connected to a steering wheel, and calculate an assist amount by combining the column torque with a vehicle velocity, in order to improve steering performance.

That is, the MDPS processing unit 10 may calculate the assist amount of the motor 40 using the column torque, the vehicle velocity and the like, and input the calculated assist amount to the motor current generator 20.

The motor current generator 20 may generate a motor current according to the assist amount inputted from the MDPS processing unit 10, and transfer the generated motor current to the motor 40.

The filter 30 may serve to filter the motor current inputted from the motor current generator 20. The filter 30 may remove a vibration component from the motor current through the filtering operation, the vibration component generating vibration on the steering wheel.

The vibration component may include noise that vibrates the steering wheel and thus degrades a steering feel. The vibration component may include a steering wheel shimmy caused by a wheel (tire) imbalance or an eccentricity or deformation of a disk wheel, natural vibration caused by a separation or distortion of a mechanical part, booming vibration which occurs in case of sudden steering, and order-related noise by motor rotation.

Referring to FIG. 2, the filter 30 may include a variable band stop filter 31, a mode setter 32, a depth adjuster 33 and a bandwidth adjuster 34.

The variable band stop filter 31 may filter a motor current. That is, the variable band stop filter 31 may remove a vibration component from the motor current inputted from the motor current generator 20, and input to the motor a motor command current from which the vibration component has been removed.

In this case, the variable band stop filter 31 may selectively filter the vibration component while one or more of a bandwidth, depth and frequency are adjusted by one or more of the mode setter 32, the depth adjuster 33 and the bandwidth adjuster 34.

Equation 1 below may indicate the variable band stop filter 31.

$$G(s) = \frac{s^2 + 2Ds + (K\omega\_0)^2}{s^2 + \frac{\omega\_0}{Q} \times s + (K\omega\_0)^2}$$   Equation 1

In Equation 1, s represents a filter transfer function.

Furthermore, $\omega\_0$ represents an angular velocity of rotation ($\omega\_0 = 2 \times \pi \times F\_0$), and $F\_0$ represents a cut-off frequency.

D represents a depth gain for adjusting the depth of the variable band stop filter 31. The depth gain may have a relation of $D < 2\omega\_0/Q$, such that the denominator of the variable band stop filter 31 is larger than the numerator thereof. Typically, the bandwidth can be blocked by an attenuation coefficient of the variable band stop filter 31. When the numerator is larger than the denominator, a band pass may occur. Therefore, the depth gain D may be set to a smaller value than $2\omega\_0/Q$, such that the denominator is larger than the numerator. Here, Q represents a bandwidth factor.

K represents a frequency factor for adjusting the frequency of the variable band stop filter 31, and may be selected as any one of a preset value and steering angular velocity.

Q represents a bandwidth factor for adjusting the bandwidth of the variable band stop filter 31 ($Q = F\_0/BW$), where BW represents a bandwidth.

Therefore, unlike a basic band stop filter, the variable band stop filter 31 may apply new parameters to the respective coefficients. For example, the variable band stop filter 31 may vary the shapes of the bandwidth, depth and frequency by adjusting the bandwidth, depth and frequency, thereby reducing noise or vibration.

The mode setter 32 may set the frequency factor of the variable band stop filter 31 depending on an operation mode.

That is, the mode setter 32 may select the operation mode for removing natural vibration frequency noise of a mechanical part or the motor 40 from the motor current or removing order-related noise based on steering velocity.

In this case, when the operation mode for removing the natural vibration frequency noise of the mechanical part or the motor 40 from the motor current is selected, the mode setter 32 may set the frequency factor to a preset value, for example, 1.

On the other hand, when the operation mode for removing order-related noise based on the steering speed is selected, the mode setter 32 may set the frequency factor to the steering angular velocity.

The frequency factor may control the center frequency F0 of the variable band stop filter 31. Since the center frequency is varied according to the steering angular velocity, the frequency factor may be usefully used to reduce the order components of the motor 40.

For example, when the 18th-order component of the motor 40 causes a problem, noise or vibration of 450 Hz ($= 25 \times 18 \times 1$ RPS) may be generated in the case where a total gear ratio of the MDPS is 25 when the steering wheel is rotated at 1 RPS (steering angular velocity), i.e. one revolution per second, based on a pinion.

However, when the steering wheel is rotated at 1.2 RPS, noise or vibration of 540 Hz ($= 25 \times 18 \times 1.2$ RPS) may be generated. Therefore, the frequency needs to be varied, in order to reduce the 18th-order noise.

Therefore, when the steering angular velocity is applied to the frequency factor in order to optimize the order component, the noise can be reduced. Furthermore, in order to reduce the natural vibration frequency noise or vibration of the mechanical part or the motor 40 regardless of the steering angular velocity, the frequency factor may be fixed to 1 at all times. Then, only the natural variable frequency noise may be band-stopped.

The depth adjuster 33 may adjust the depth of the variable band stop filter 31 according to the steering angular velocity of the steering wheel. In this case, as the steering angular velocity of the steering wheel is increased, the depth adjuster 33 may decrease the depth gain of the variable band stop filter 31.

The depth gain may be decreased as the steering angular velocity is increased. Since noise is amplified when the steering angular velocity is increased, a large noise or vibration reduction effect may be required.

Therefore, as the steering angular velocity is increased, the depth adjuster 33 may reduce the depth gain to increase the depth of the variable band stop filter 31. Then, the noise of the motor current can be removed while the vibration reduction effect is improved.

When the steering angular velocity is increased, disturbance or noise may additionally occur around a noise occurrence frequency. Therefore, the bandwidth of the variable band stop filter 31 needs to be widened.

The bandwidth adjuster 34 may adjust the bandwidth of the variable band stop filter 31 according to the steering angular velocity of the steering wheel. That is, the bandwidth adjuster 34 may reduce the bandwidth by increasing the bandwidth factor of the variable band stop filter 31 as the steering angular velocity of the steering wheel is increased.

When the MDPS system is driven, the controller 50 may control the filter 30 to remove the vibration component of the motor current.

For this operation, when the MDPS processing unit 10 is operated and the motor current generator 20 generates a motor current, the controller 50 may control the filter 30 to filter the vibration component of the motor current generated by the motor current generator 20. Then, a motor command current from which the vibration component has been filtered may be inputted to the motor 40.

In this case, the controller 50 may tune the variable band stop filter 31 according to the steering angular velocity of the steering wheel.

That is, as illustrated in FIG. 3, the controller 50 may decrease the depth gain of the variable band stop filter 31 according the steering angular velocity of the steering wheel, thereby reducing noise.

As illustrated in FIG. 4, the controller 50 may increase the bandwidth by reducing the bandwidth factor of the variable band stop filter 31 according to the steering angular velocity of the steering wheel, thereby band-stopping only a desired region while reducing a sense of difference during a steering operation.

Figure 6:
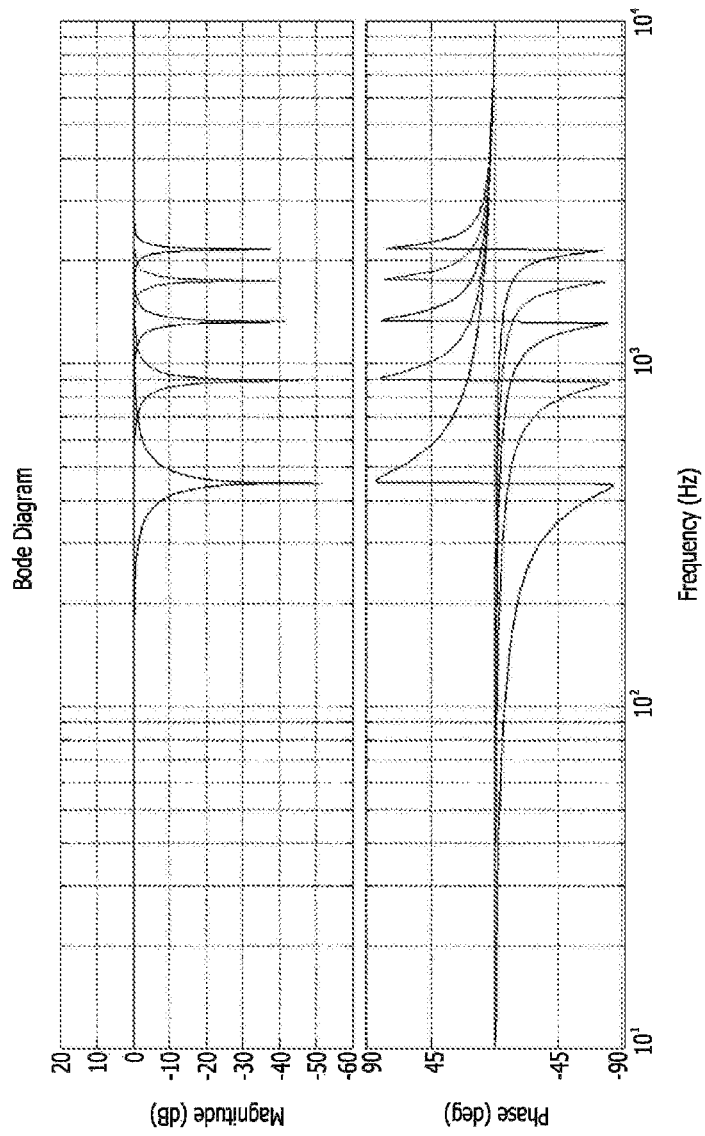
FIG. 6 is a graph illustrating a filter change by depth gain and frequency factor adjustment in accordance with the embodiment of the present invention.

The controller 50 may control the mode setter 32 to set the frequency factor of the variable band stop filter 31 to 1 or the steering angular velocity as illustrated in FIGS. 5 and 6, thereby removing the natural vibration frequency noise or steering velocity of the mechanical part or the motor 40 or the noise of the order component based on the steering velocity.

Furthermore, as illustrated in FIG. 6, the controller 50 can reduce noise by adjusting not only the frequency factor, but also the depth gain.

That is, the controller 50 may set the frequency factor of the variable band stop filter 31 to the preset value or the steering angular velocity, or adjust the bandwidth or the depth gain of the variable band stop filter 31 according to the steering angular velocity of the steering wheel, thereby removing the vibration component of the motor current and providing steering stability and comfortable steering feel.

Hereafter, a steering feel control method of an MDPS in accordance with an embodiment of the present invention will be described with reference to FIG. 6.

Figure 7:
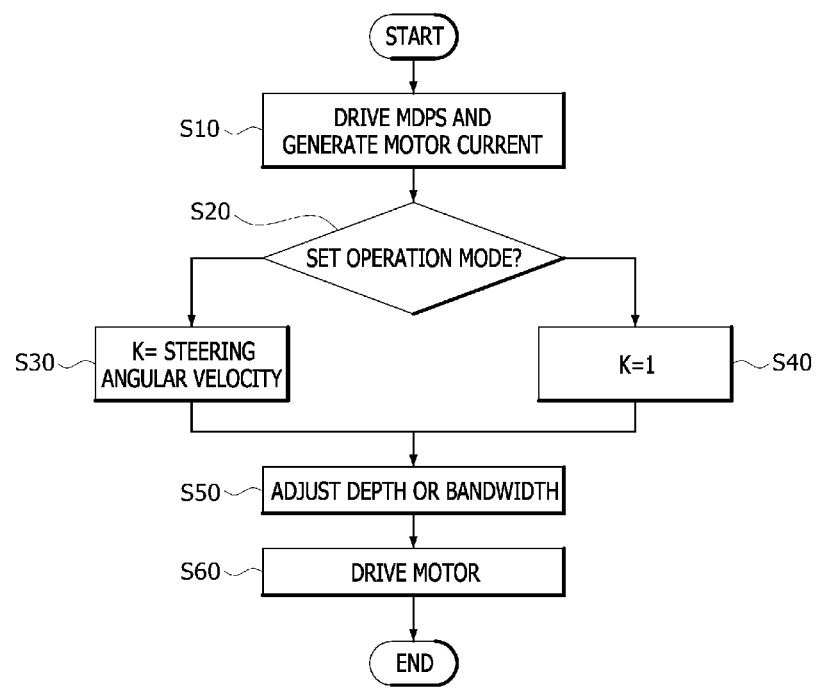
FIG. 7 is a flowchart illustrating a steering feel control method of an MDPS in accordance with an embodiment of the present invention.

FIG. 7 is a flowchart illustrating a steering feel control method of an MDPS in accordance with an embodiment of the present invention.

Referring to FIG. 7, when the MDPS processing unit 10 is operated to generate an assist amount, the motor current generator 20 may generate a motor current according to the assist amount, at step S10.

Therefore, the controller 50 may set the operation mode at step S20, and the mode setter 32 may set the frequency factor of the variable band stop filter 31 according to the operation mode at step S30 or S40.

For example, when the operation mode is selected to remove noise of an order component based on a steering velocity, the mode setter 32 may set the frequency factor to the steering angular velocity at step S30.

On the other hand, when the operation mode is selected to remove the natural vibration frequency noise of the mechanical part or the motor 40 from the motor current, the mode setter 32 may set the frequency factor to the preset value, for example, 1.

Then, the controller 50 may adjust the depth of the variable band stop filter 31 through the depth adjuster 33, or adjust the bandwidth of the variable band stop filter 31 through the bandwidth adjuster 34, according to the operation mode at step S50.

That is, the controller 50 may reduce the bandwidth by decreasing the depth gain of the variable band stop filter 31 or increasing the bandwidth factor of the variable band stop filter 31, as the steering angular velocity of the steering wheel is increased.

Therefore, the variable band stop filter 31 may remove various vibration components within the motor current while the frequency factor, bandwidth and depth are adjusted, according to the operation mode at step S60.

In accordance with the embodiments of the present invention, the steering feel control apparatus and method of the MDPS system can detect vibration or noise from the column torque or motor current, and reduce the detected vibration or noise through the variable band stop filter, thereby reducing vibration of the MDPS system.

Furthermore, the steering feel control apparatus and method of the MDPS can reduce a steering wheel shimmy caused by a wheel (tire) imbalance or an eccentricity or deformation of the disk wheel, and reduce natural vibration caused by a separation or distortion of the mechanical part, thereby providing steering stability and comfortable steering feel to the driver.

Furthermore, the steering feel control apparatus and method of the MDPS can reduce vibration and perform vibration compensation without additionally applying a mechanical device, which makes it possible to reduce the number of parts used in the MDPS system and the manufacturing cost.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A steering feel control apparatus of a motor driven power steering (MDPS) system, comprising:
    a filter configured to filter a motor current inputted to a motor and remove a vibration component that generates vibration on a steering wheel; and
    a controller configured to control the filter to remove the vibration component of the motor current when the MDPS system is operating,
    wherein the filter comprises:
        a variable band stop filter configured to filter the motor current; and
        a bandwidth adjuster configured to adjust a bandwidth of the variable band stop filter according to a steering angular velocity of the steering wheel,
    wherein the bandwidth adjuster is configured to reduce the bandwidth by increasing a bandwidth factor of the variable band stop filter as the steering angular velocity of the steering wheel is increased.

2. The steering feel control apparatus of claim 1, wherein the filter comprises:
    a variable band stop filter configured to filter the motor current; and
    a depth adjuster configured to adjust a depth of the variable band stop filter according to a steering angular velocity of the steering wheel.

3. The steering feel control apparatus of claim 2, wherein the depth adjuster is configured to decrease a depth gain of the variable band stop filter as the steering angular velocity of the steering wheel is increased.

4. The steering feel control apparatus of claim 1, wherein the filter comprises:
    a variable band stop filter configured to filter the motor current; and
    a mode setter configured to set a frequency factor of the variable band stop filter according to an operation mode.

5. The steering feel control apparatus of claim 4, wherein the mode setter is configured to set a frequency factor of the variable band stop filter to a preset value or a steering angular velocity of the steering wheel.

6. A steering feel control method of a motor driven power steering (MDPS) system, comprising the steps of:
    generating, by a motor current generator, a motor current; and
    filtering, by a filter, the motor current through a variable band stop filter, wherein a vibration component that generates vibration on a steering wheel is removed from the motor current generated by the motor current generator,
    wherein the step of filtering of the motor current comprises:
        removing an order-related noise based on natural vibration frequency noise or steering velocity by setting a frequency factor of the variable band stop filter according to an operation mode; and
        tuning the variable band stop filter according to a steering angular velocity of the steering wheel, and
    wherein the step of tuning of the variable band stop filter comprises adjusting a depth of the variable band stop filter according to a steering angular velocity of the steering wheel.

7. The steering feel control method of claim 6, wherein the step of removing of the order-related noise comprises setting a frequency factor of the variable band stop filter to a preset value or a steering angular velocity of the steering wheel.

8. The steering feel control method of claim 6, wherein the step of tuning of the variable band stop filter comprises adjusting a bandwidth of the variable band stop filter according to a steering angular velocity of the steering wheel.

9. The steering feel control method of claim 8, wherein the step of tuning of the variable band stop filter comprises reducing the bandwidth by increasing a bandwidth factor of the variable band stop filter as the steering angular velocity of the steering wheel is increased.

10. The steering feel control method of claim 6, wherein the step of tuning of the variable band stop filter comprises decreasing a depth gain of the variable band stop filter as the steering angular velocity of the steering wheel is increased.

11. A steering feel control apparatus of a motor driven power steering (MDPS) system, comprising:
- a filter configured to filter a motor current inputted to a motor and remove a vibration component that generates vibration on a steering wheel; and
- a controller configured to control the filter to remove the vibration component of the motor current when the MDPS system is operating;

wherein the filter comprises:
- a variable band stop filter configured to filter the motor current; and
- a depth adjuster configured to adjust a depth of the variable band stop filter according to a steering angular velocity of the steering wheel.

* * * * *